June 17, 1958   W. H. BAUMGARTNER   2,839,743
FAULT INDICATOR DEVICE FOR POWER SUPPLY SYSTEM
Filed Feb. 23, 1956
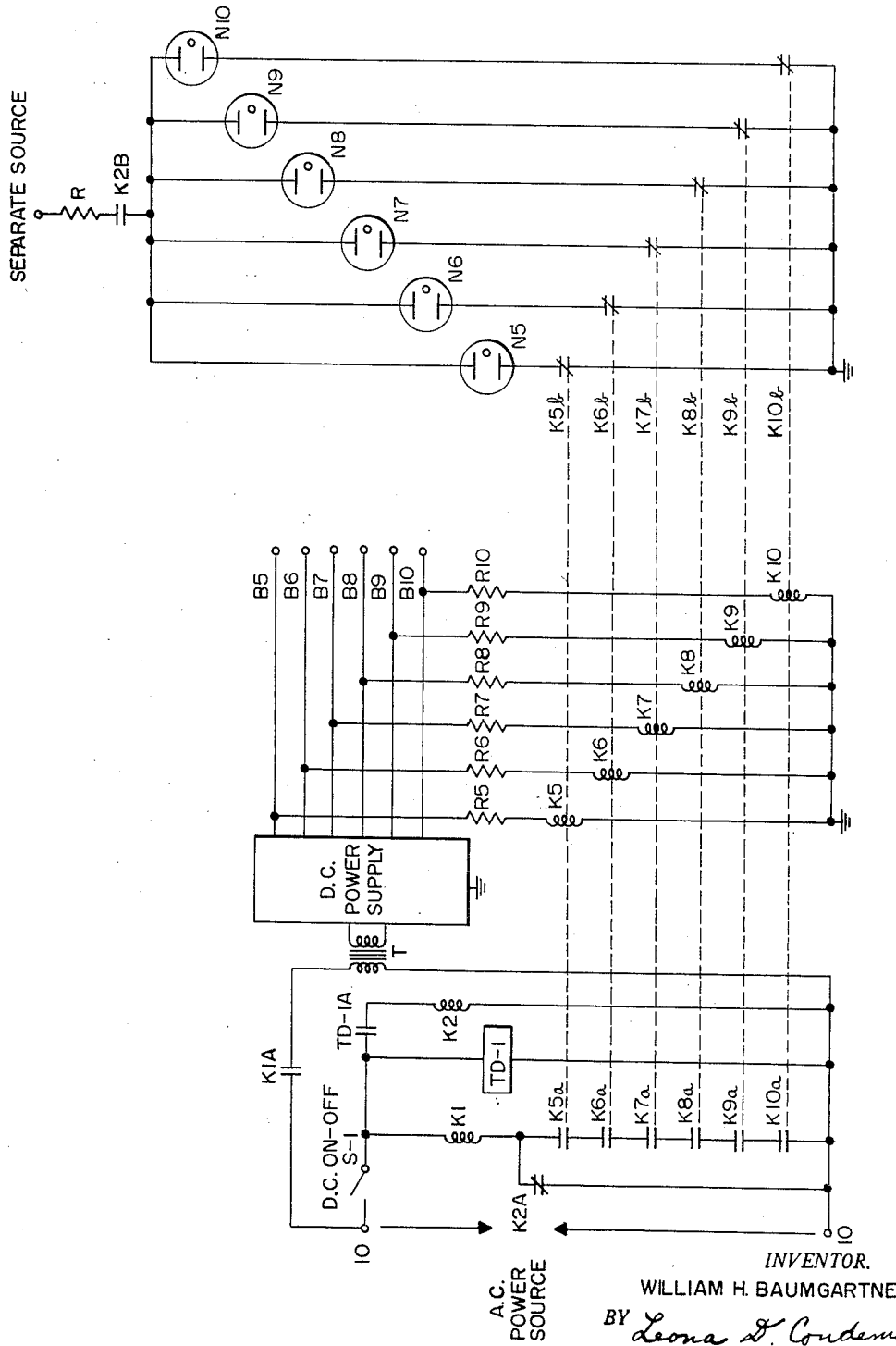
INVENTOR.
WILLIAM H. BAUMGARTNER
BY Leona D. Condemi
ATTORNEY

United States Patent Office 2,839,743
Patented June 17, 1958

2,839,743

FAULT INDICATOR DEVICE FOR POWER SUPPLY SYSTEM

William H. Baumgartner, Glenside, Pa., assignor to Burroughs Corporation, Detroit, Mich., a corporation of Michigan Application February 23, 1956, Serial No. 567,347

2 Claims. (Cl. 340—253)

This invention relates to an electrical system for protecting a multiple-circuit power supply from undesirable effects of abnormal reduction of voltage in any one of the circuits and more particularly to electro-mechanical means which provide visual indication of that one of the circuits in which such voltage reduction occurs.

In multiple-circuit power supply systems wherein failure or fault of one circuit will result in shut-down of all other circuits, as, for example, in the system of copending application of the present inventor, Serial No. 543,138, filed October 27, 1955, ascertaining which of the shut-down circuits is the faulty one requires time-consuming and unsatisfactory maintenance procedures. In some instances this failure or abnormal voltage reduction in the circuit is accompanied by blowing of a fuse. In other cases, for example where a very short time constant abnormal voltage reduction doesn't give the fuse time to open, blowing of fuse does not follow fault in the circuit and consequent shut-down of all other circuits. The present invention provides visual indicating means which enable an operator to know immediately exactly which circuit fails. In the situation where there occurs blowing of a fuse, the visual indication means of the invention permit speedier maintenance since the serviceman is not required to check a large number of fuses to locate the one which was blown, but, instead, sees immediately which circuit requires servicing or repair. Where there is fault in a circuit and the fuse does not blow, the device of the present invention spots the circuit for the serviceman so that he is not required to start the machine up again to locate the faulty circuit. In complicated apparatus such as computers, visual fault indication results in greatly improved maintenance and operating performance, and prevents harming of delicate parts which would be a consequence of restarting and rerunning the unit to locate the faulty circuit.

The device of the present invention is applicable to protection of any multiple-circuit power supply system; it will be described herein with reference to a power supply system for a computer or like unit.

The present invention achieves selective sensing of a faulted circuit among several of a common power supply and visual indication thereof to protect the supply from harm caused by the methods heretofore necessary for locating the faulted circuit.

The invention further benefits efficient operation of computers and other complicated types of apparatus in that it facilitates location of blown fuses in cases where abnormal reduction of voltage in any circuit results in blowing of a fuse.

It is an important object of the present invention to provide automatic means for indicating which circuit of a plurality of such circuits having a common power supply has failed.

It is another important object of the invention to provide visual means to enable the serviceman to identify the faulty circuit without restarting the unit to locate the fault.

A further object of the invention is to provide a fault indicating device for a power supply circuit having a plurality of voltages wherein failure of one voltage will remove all voltages, and wherein there will be an indication of that circuit in which the failure occurs, both in a simple manner without greatly increasing the existing number of parts required.

A further important object of the invention is to provide a simple and efficient failure indication device suitable for inclusion in the overall design of a computer or other similar apparatus.

Yet another important object of the invention is the facilitation of efficient maintenance of computers and similar units even in cases where loss of voltage is effective to blow a fuse, since the visual indication means of the invention inform the serviceman of the specific circuit which has failed and maintenance procedure is thus greatly simplified.

In the embodiment of the invention presented herein there is described a system for protecting a power supply having a plurality of buses for providing voltages to different circuits and including a relay for each bus, sensitive to at least abnormal power loss thereof. The relays each have a first set of contacts serially interconnected with each other and arranged to maintain energization of the power supply circuit which in turn energizes all the buses. This first set of contacts is operable to interrupt power from the supply upon sensing of a fault in the circuit of any corresponding relay.

Each voltage bus has a glow indicator lamp connected for operation through a further or second set of contacts provided for each relay. The lamps are connected to be in parallel with each other whenever the second contacts are closed, and the second contact of each relay is operable to connect to the associated lamp and to an energization source upon fault of the circuit of its relay. This source is a continuously operable power source which completes the circuit for the lamps. To obtain visual indication by means of lighting of only one of the lamps upon fault in a circuit and subsequent shut-off of power from the source, there is provided a voltage dropping resistor serially connected with all the lamps and the power source. The resistor is of predetermined ohmic value to permit lighting of one indicator lamp from the power source upon fault of its associated circuit and to present a voltage drop due to lamp current sufficient to prevent simultaneous lighting of any of the remaining lamps. The glow lamps are neon bulbs or the like and because of the property of such lamps, when one conducts, the voltage drop across the common voltage dropping resistor becomes such that the voltage across the other lamps canot initiate a glow. Thus, although all the other lamps are also connected to the power supply when the sensing relays are all operated by the D. C. power shut-off, they will be unable to light because of current passed by the initially energized lamp, which indicates that circuit in which the failure resides.

The drawing illustrates a schematic diagram of a circuit embodiment for protecting a power supply system and for indicating the circuit in which a failure occurs, in accordance with the present invention.

In Fig. 1 there is shown a D. C. power supply powered through transformer T and relay contacts K1A from A. C. power source leads 10—10. Relay K1 is controlled by D. C. "on-off" switch S-1. Relay contacts K1A are normally open but close when K1 is energized.

The D. C. power supply feeds a plurality of buses here shown as six and enumerated B5 to B10. K1 is a relay for energizing the power supply by coupling the transformer T to the A. C. power source. Time delay relay TD-1 receives voltage upon closing switch S-1 as does relay K1, the latter completing a circuit through the closed contact K2A but time delay relay TD-1 is operative only after an interval of about 1-2 seconds to energize relay K2, by closing contact TD-1A. Accordingly, contact K2a opens and contacts K5a to K10a in series must all be closed to maintain energization of the transformer T.

Two-pole sensing relays K5 to K10 inclusive are provided for response to abnormally reduced voltage on the respective D. C. buses B5 to B10. Each of these relays becomes energized to change the position of respective contacts K5a to K10a and K5b to K10b when the respective D. C. bus is energized. Contacts 5Ka through K10a are the "a" poles for the relays and are all in series in the coil circuit of relay K1 for maintaining D. C. power and initiating shut-off in event of abnormally low voltages. Contacts K5b through K10b are the "b" poles for the sensing relays and each "b" contact is individually in series with a separate neon lamp of the neon lights shown in the drawing with corresponding numbers N5 to N10. These may be NE-2's or other glow discharge lamps having similar characteristics. The lights are connected in parallel relationship with each other by means of contacts K5b to K10b and are in series with the dropping resistor R which is of predetermined ohmic value. Contact K2B is connected with the lamps to energize them only after the D. C. voltages are on. The lamps may be supplied by a separate energization source, as shown, or in any other manner, so that power is always available to them. The "a" contacts are shown in this embodiment as closable upon operation of the relays and the "b" contacts, as openable thereupon.

Resistances R5 to R10 are used to limit the current drawn from the D. C. buses B5 to B10 by the sensing relays K5 to K10, if necessary, and may comprise the internal relay solenoid resistance.

In operation, as switch S-1 is closed, K1 is turned on through the normally closed contact K2A. After the interval of TD-1, K2A opens but by this time the D. C. buses are energized and the sensing relays K5 to K10 are energized to close contacts K5a to K10a, completing the coil circuit of K1. Closing of K2B puts voltage on the neon lights but their circuits are incomplete since by this time the "b" contacts are open.

If the voltage on any one D. C. bus is abnormally reduced due to a blown fuse or for other cause, the respective sensing relay will open the "a" contact breaking the coil circuit of K1 and turning off the entire D. C. supply to all buses after operation of relay K1. Also, the "b" contact of that sensing relay will close, turning on the particular neon light which conducts through resistor R. The voltage drop through R lowers the voltage across the other neon lights below the firing value. Consequently, when the other "b" contacts close due to turning off of the D. C. supply, when all the buses become de-energized, the other neon lights do not fire. Thus, only the light related to the bus in which failure occurs will go on and stay on even though the D. C. supply is turned off. The neon light is turned off by turning the "on-off" switch S-1 to "off," opening K2 and its contact in series with the transformer T. As shown, the source for operating the neon lamps is separate and not energizable through the contact of K1 to assure operation of lamps when a fault occurs.

In the embodiment illustrated herein, the device includes sensing relays connected across the buses of a multiple-circuit power supply, indicator lamps associated with "b" contacts of the relays, a dropping resistor in series with all the lamps, and means cooperatively interconnecting the indicator means with the power supply to effect selective indication of circuit failure.

Lamps of the glow discharge type, such as the neon lights herein presented, have characteristics of response to voltage variations which render them particularly effective in the present invention to give consistently accurate sensing and indication of voltage variations in the circuits herein described. Reference is made to "The Design of Switching Circuits" by Keister, Ritchie and Washburn, D. Van Nostrand, New York, 1951, particularly pages 208-209 thereof for the well known operating conditions of circuits utilizing these lamps.

The present invention successfully solves the problem of obtaining effective indication of the specific faulty circuit in a system wherein a plurality of circuits are supplied by means of a common power converter and where-in fault in one circuit automatically turns off power for the others. Although, in cases where abnormally reduced voltage of a circuit is accompanied by blowing of a fuse, it would be possible to service the unit by locating the blown fuse without re-running the unit, this would be slow and inconvenient maintenance procedure. The present invention provides visual indication of the faulty circuit which is more effective than the "fuse-hunt" method. To correct the fault of the circuit in other cases where a fuse is not blown, it would be necessary, ordinarily, to have the serviceman restart the power supply running and stand by to watch which of the circuits requires attention. Such restarting is especially harmful in complex units such as computers since the delicate and very expensive components are harmed during re-starting and re-running with the fault still uncorrected. The present invention thus provides a device which is includible with such units or similar equipment to protect them and to render servicing more efficient and economical.

What is claimed is:

1. A protective system for interrupting, under certain abnormal conditions, the voltages supplied to a plurality of circuits and for indicating the particular circuit in which the abnormality occurred comprising in combination a source of alternating current, a direct current generator for producing said voltages, a starting relay having an energizing circuit and adapted to connect the generator to the source, a plurality of indicating devices, a plurality of sensing relays each having its energizing winding actuated by one of said voltages, said sensing relays having when energized a first plurality of closed contacts and a second plurality of open contacts, said closed contacts being connected in series relationship to one another and to said energizing circuit of said starting relay, said open contacts of each of said sensing relays being connected in series with each of said indicating devices, a continuously available power source for energizing said devices, each of said sensing relays being individually responsive to the magnitude of the energizing voltage associated therewith and adapted under certain abnormal conditions to open its said closed contacts in series with the energizing circuit of said starting relay thereby inactivating said direct current supply and simultaneously to close its said open contacts in series with an indicating device in order to produce a sustained indication of the circuit in which the abnormality occurred.

2. An undervoltage protection system for removing the voltages supplied to a plurality of circuits whenever any one of the said voltages drops below a minimum value and including neon glow lamps for giving a sustained indication of the particular circuit in which the fault occurred, comprising in combination a source of alternating current, a direct current power supply for generating said voltages, a starting relay having an energizing circuit and adapted to connect the power supply to the source, a plurality of neon glow indicator lamps arranged in a parallel circuit configuration, a plurality of electromagnetic undervoltage relays each having its sensing winding connected in parallel across one of said plurality of circuits, said undervoltage relays having when energized a first plurality of closed contacts and a second plurality of open contacts, said closed contacts being serially interconnected and constituting a portion of the energizing circuit path associated with said starting relay, said open contacts of each of said sensing relays being connected in series with each of said glow lamps, a continuously available power source for energizing said lamps, common impedance means for connecting said lamp circuits to said continuous power source, each of said undervoltage relays being individually responsive to the magnitude of the voltage across its sensing winding and adapted under conditions of abnormally low voltage to open its closed contacts thereby breaking the energizing circuit of said starting relay and causing the shut-down of the direct current supply and simultaneously to close its open contacts thereby establishing a closed circuit path for the particular glow lamp indicator associated with the circuit in which the low voltage occurred and causing the firing of said lamp, the voltage dissipated in said common impedance as a result of the current flowing therethrough being of such magnitude that the remaining voltage is insufficient to cause the subsequent firing of the remaining indicator lamps after the shut-down of the direct current supply and the consequent closure of all said open contacts in the glow lamp circuits.

References Cited in the file of this patent

UNITED STATES PATENTS

| | | |
|---|---|---|
| 2,057,531 | Livingston | Oct. 13, 1936 |
| 2,405,397 | Bedford | Aug. 6, 1946 |
| 2,569,475 | Klein | Oct. 2, 1951 |
| 2,719,966 | Schurr | Oct. 4, 1955 |
| 2,736,009 | Barnickel | Feb. 21, 1956 |